(12) United States Patent
Powers (10) Patent No.: US 8,456,029 B2
(45) Date of Patent: Jun. 4, 2013

(54) SYSTEMS, APPARATUSES AND METHODS FOR THE TRANSMISSION OF ENERGY AND POWER

(76) Inventor: Christopher F. X. Powers, Hayden, ID (US)

( * ) Notice: Subject to any disclaimer, the term of this patent is extended or adjusted under 35 U.S.C. 154(b) by 0 days.

(21) Appl. No.: 13/436,242

(22) Filed: Mar. 30, 2012

(65) Prior Publication Data
US 2012/0189473 A1 Jul. 26, 2012

Related U.S. Application Data

(63) Continuation of application No. 12/460,216, filed on Jul. 14, 2009, now Pat. No. 8,169,091.

(51) Int. Cl.
*F03D 9/00* (2006.01)

(52) U.S. Cl.
USPC .......................................... 290/1 R; 290/1 A (58) Field of Classification Search
USPC ..................... 290/1 R, 1 A, 4 C, 39
See application file for complete search history.

(56) References Cited

U.S. PATENT DOCUMENTS

| | | | |
|---|---|---|---|
| 954,471 A | 4/1910 | Schmidt | |
| 4,352,023 A | 9/1982 | Sachs | |
| 4,387,513 A | 6/1983 | Cowdin | |
| 5,167,163 A | 12/1992 | McMahon et al. | |
| 6,109,123 A * | 8/2000 | Baskis et al. | 74/89.1 |
| 6,325,142 B1 * | 12/2001 | Bosley et al. | 166/53 |
| 6,876,095 B2 * | 4/2005 | Williams | 290/1 R |
| 7,375,436 B1 * | 5/2008 | Goldin | 290/42 |
| 8,169,091 B2 * | 5/2012 | Powers | 290/1 R |
| 8,299,659 B1 * | 10/2012 | Bartol, Jr. | 310/36 |
| 2007/0075545 A1 | 4/2007 | Wilson et al. | |
| 2010/0244451 A1 * | 9/2010 | Ahdoot | 290/53 |
| 2011/0012443 A1 * | 1/2011 | Powers | 310/36 |
| 2011/0229322 A1 | 9/2011 | Tadayon | |
| 2011/0248580 A1 * | 10/2011 | Powers | 310/37 |

FOREIGN PATENT DOCUMENTS

EP 2209190 A 7/2010

OTHER PUBLICATIONS

International Search Report and Written Opinion mailed May 12, 2012, PCT Application No. PCT/US2011/039147, 9 pages.

* cited by examiner

*Primary Examiner* — Nicholas Ponomarennko
(74) *Attorney, Agent, or Firm* — Mark Farrell; Timberline Patents (57) ABSTRACT

Systems and apparatuses for delivering power and energy using deflecting beams or other oscillating members motivated to oscillate a beam assembly using an eccentrically balanced rotating body that induces deflections in the elastic beam or other oscillating member. One or more rotors may be used on the elastic beams and a mechanical output or outputs are connected to the elastic beams. The rotating body is advantageously maintained in rotation by pulses of electromagnetic force. One or more outputs may be used to drive heat pumps, compressors, pumps or other equipment to assist in independent energy systems.

8 Claims, 11 Drawing Sheets

SYSTEMS, APPARATUSES AND METHODS FOR THE TRANSMISSION OF ENERGY AND POWER

CROSS-REFERENCE TO RELATED APPLICATIONS

This is a continuation of, and incorporates by reference in its entirety, U.S. patent application Ser. No. 12/460,216.

BACKGROUND

The efficient utilization of energy has been a long-felt need and while many individuals have tried to develop means to more efficiently utilize energy and produce power therefrom, there still exists a need for energy and power transformation systems which can serve a multitude of purposes and do so efficiently. There is also a need for systems which can store energy and have low transmission and/or storage losses.

BRIEF DESCRIPTION OF THE DRAWINGS

Preferred forms, configurations, embodiments and/or diagrams relating to and helping to describe preferred aspects and versions of the inventions are explained and characterized herein, often with reference to the accompanying drawings. The drawings and all features shown therein also serve as part of the disclosure of the inventions of the current document, whether described in text or merely by graphical disclosure alone. Such drawings are briefly described below.

DETAILED DESCRIPTION

The readers of this document should understand that the embodiments described herein may rely on terminology used in any section of this document and other terms readily apparent from the drawings and the language common therefor as may be known in a particular art and such as known or indicated and provided by dictionaries. Dictionaries were used in the preparation of this document. Widely known and used in the preparation hereof are Webster's Third New International Dictionary (© 1993), The Oxford English Dictionary (Second Edition, © 1989), and The New Century Dictionary (© 2001-2005), all of which are hereby incorporated by reference for interpretation of terms used herein and for application and use of words defined in such references to more adequately or aptly describe various features, aspects and concepts shown or otherwise described herein using more appropriate words having meanings applicable to such features, aspects and concepts.

This document is premised upon using one or more terms with one embodiment that may also apply to other embodiments for similar structures, functions, features and aspects of the inventions. Wording used in the claims is also descriptive of the inventions, and the text and meaning of the claims and abstract are hereby incorporated by reference into the description in their entirety as originally filed. Terminology used with one, some or all embodiments may be used for describing and defining the technology and exclusive rights associated herewith.

The readers of this document should further understand that the embodiments described herein may rely on terminology and features used in any suitable section or other embodiments shown in this document and other terms readily apparent from the drawings and language common or proper therefor. This document is premised upon using one or more terms or features shown in one embodiment that may also apply to or be combined with other embodiments for similar structures, functions, features and aspects of the inventions and provide additional embodiments of the inventions.

Overview of Some Preferred Apparatuses

The inventions may include deflecting members, such as elastically deformable beams or other structures having a rotating or other oscillatory body or bodies. In some preferred embodiments this is an eccentrically weighted rotating body or bodies mounted upon the deflecting members for inducing oscillation of the deflecting members. In some preferred embodiments the oscillations are induced at the natural resonance of the deflecting members.

In some preferred embodiments the rotating body or bodies may have at least one magnet which is mounted on them. In addition, there is an electromagnetic pulse motor or other driver for sustaining movement of the oscillating. In some embodiments, an electromagnetic pulse motor is included which interacts by magnetic field and without contact with the rotor or rotor magnets. The pulsed magnetic drive provides intermittent pulses at a desired and preferably controlled time. As the driver magnet or magnets are pulsed with controlled magnetic fields the resulting torque applied to the rotor maintains rotation or other oscillation of the rotors.

The amount of startup energy may be reduced by having the eccentrically weighted or other rotating body or bodies begin to rotate under the force of gravity and then maintain rotation with small consumption of electricity that is used to provide pulsed magnetic fields or other non-contacting torque inducers to maintain rotation or other oscillation inducing drivers.

The rotation of eccentrically weighted body or bodies causes the supporting members or beams to deflect and create an oscillating action and force. The oscillating action can be from a spinning weight or other suitable apparatuses.

The mechanical output may be used to power one or more fluid working devices, such as a pump or compressor for pumping or compressing fluids, electromagnetic generators which generate current which may be stored in batteries, capacitors or other suitable apparatuses, or other means to store energy, now known or hereafter developed.

The produced mechanical, electrical or other form of power can be used to power the pump or compressor for real time use, or be used to store energy in various forms for use at a later time to maintain a consistent or adequate power to be supplied. Water can be pumped in elevation to provide stored potential energy. Gases can be compressed to also store energy in the form of pressured gas.

In some systems, a battery may be used as an energy storage device or devices for driving the oscillating mechanical force. The battery or other energy storage device may be powered by solar or wind electricity generators or other alternative input of power which can be stored and then used as a power source to generate electrical power used to maintain the oscillating system in motion.

The description of specific apparatuses, systems and subsystems and methods included herein illustrate various embodiments according to this invention.

First Embodiment

Figure 1:
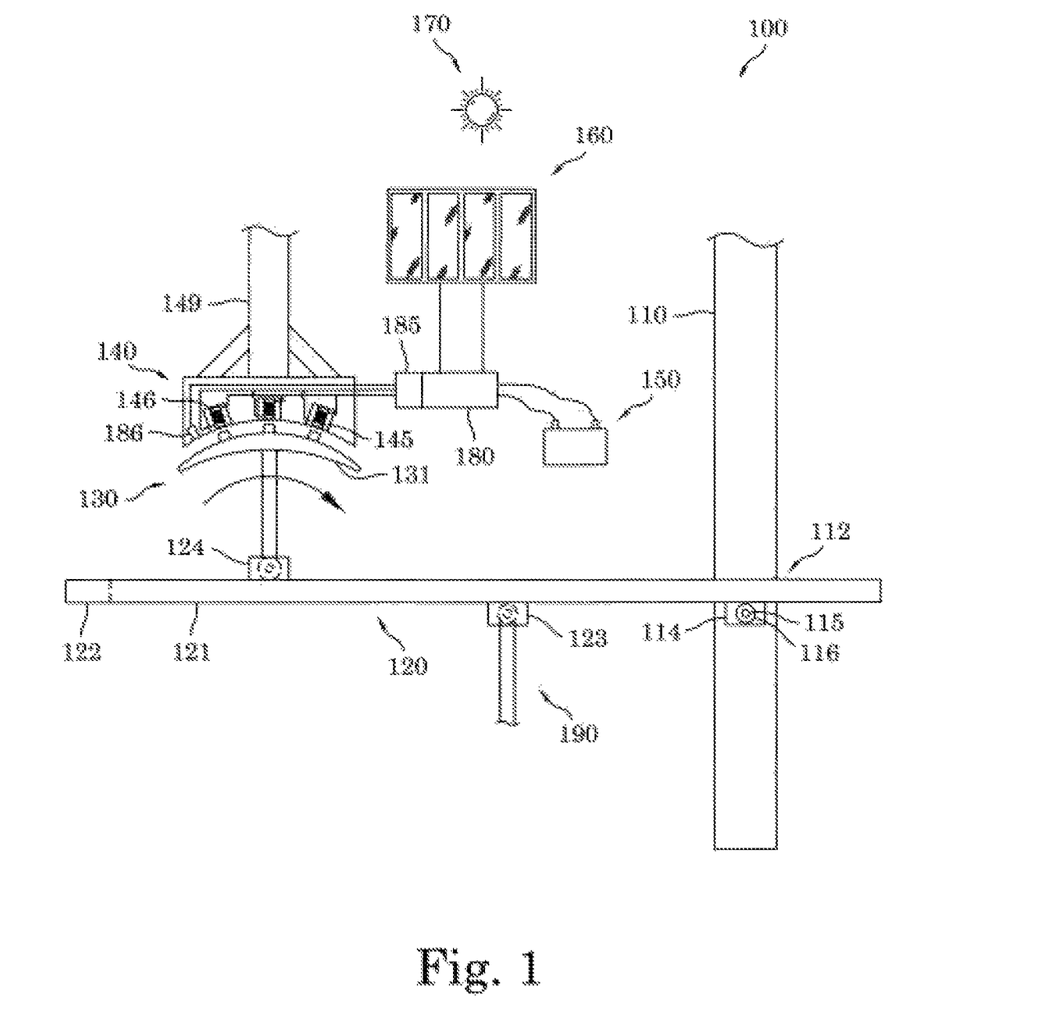
FIG. 1 is a front view of one preferred embodiment according to the inventions hereof.

FIG. 1 shows a diagrammatic view of important parts of a first preferred system 100 according to a preferred embodiment of the inventions shown or described herein. The main parts of system 100 advantageously include a main support 110 which is used to support a beam assembly 120. The beam assembly moves, such as in an oscillatory action, when in operation.

The beam assembly 120 oscillates in response to an oscillation inducing system 130. Oscillation inducing system 130 advantageously uses a rotating weight which is unbalanced relative to the center of rotation. The oscillation driver 140 may be powered by a battery 150 or other suitable source of power. As shown, the battery or batteries can be charged by a solar array 160 powered by the sun 170. The solar array can be made according to suitable technologies now known or hereafter developed. Other sources of energy or direct power are also possible in some forms of the invention.

As shown, solar array 160 is electrically connected to supply electrical power to a controller 180 which distributes electricity as further explained below. Controller 180 is advantageously designed to control distribution of power to the battery. It may also be configured to have a second section 185 used to control delivery of electrical power to the oscillation driver 140 as will be more fully described below.

The system of FIG. 1 also has an output 190. Output 190 is advantageously mechanically coupled to the beam assembly 120 for pivotal movement and functions by deriving power from the displacement of beam assembly 120. Output 190 may be used to drive different types of power consuming units (not illustrated in FIG. 1).

Beam Support

The beam support 110 is the primary support for the various parts of the system 100 and in particular is designed to support the beams 120 or other deflecting members and other portions of system 100.

Support 110 as shown is a column which may be suitably connected to mounting framework (not shown). The mounting framework may include a foundation or other supporting structure (not shown) used to support the lower or first end of the beam support 110. The opposing second end or upper portions of beam support or supports 110 are advantageously connected to a building which acts as a suitable superstructure. For example, the upper end may be supported by an elevated portion of the mounting framework, such as a ceiling joist of a building (not shown) or a brace or mainstay (also not shown).

The framework is preferably made so as to mount the beam support 110 in a relatively rigid condition as compared to the deflecting members described in greater detail below. However, it may alternatively be suitable to have other frameworks which are hereafter determined or found suitable for the functions described herein.

Mounted upon the beam support 110 are the deflecting members 120. Connections between the beam support and the beam assemblies or other deflecting members can be of various constructions. As shown in FIG. 1, the beam assembly connection is pivotal as described further below. Other alternatives some of which are described below may also be found suitable or preferred depending on the particulars of a given installation or further experimentation made hereafter.

The beam support 110 can be made of a variety of suitably strong and preferably substantially rigid materials, such as concrete, steel, wood, fiberglass or various other materials suitable for the installation involved.

Beam Assembly or Assemblies

Figure 2:
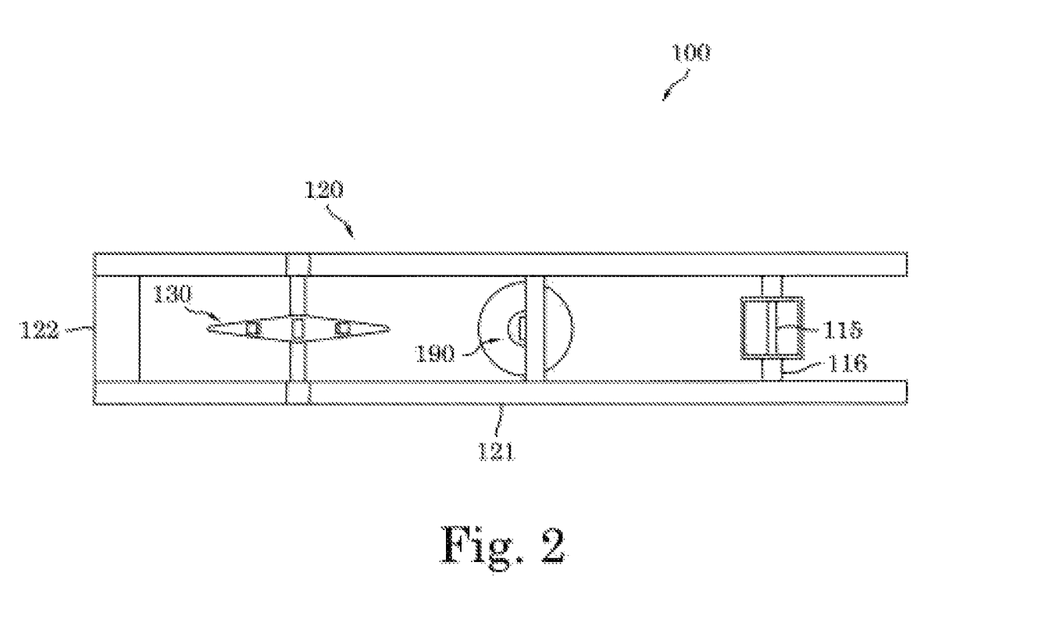
FIG. 2 is a top view of the rotating body mounted to the deflecting member forming part of the embodiment of FIG. 1.

FIG. 1 shows one preferred version of the beam assembly 120 which forms a deflecting member. In this version the deflecting member or assembly is mounted in a cantilevered configuration upon support 110. The configuration also uses the oscillator connection in a position which is distal to the output 180 and thus forms a second degree lever arrangement. A top view of the apparatus is shown in FIG. 2 which depicts the deflecting members and the mounted rotating body and one possible way in which the apparatus may be constructed.

In the embodiment of FIG. 1 the beam assembly is preferably a support advantageously in the form of a pair of beams in a parallel or substantially parallel relationship extending from the support in parallel or other suitable configuration depending on the geometry of the support and applied loads.

In a single cantilever arrangement as shown in FIG. 1, and other configurations shown below it may alternatively be possible to have deflecting beams which may converge or be oriented relative to one another in non-parallel or specially shaped configurations to provide dynamic response capabilities which may be found advantageous in certain forms of the inventions according hereto. As shown, the beams 121 are arranged along opposing sides of support 110. They may be joined by cross members arranged and connected to tie the parallel beams 121 in a configuration which can be visualized as a ladder-shaped assembly. This is indicated by the cross members 122, 123 and 124.

Connection of Beam Members to Support

In FIG. 1 the two deflecting beam members 121 are shown to have connections to support 110 which are pivotal. The pivotal connections are advantageously provided on both front and rear sides of columnar support 110.

As illustrated, the connections 112 have a bearing support piece or block 114 fixed to the beam. A pivot shaft 115 is provided which may be provided at each side or be mounted through the support column 110. Bearings 116, such as ball or roller bearings are provided to allow free angular displacement upon each side of the support to the beams forming parts of beam assembly 120.

As further indicated herein other beam assembly connections may also be used. They can also be connected in any other suitable alternative way to the support at one or more couplings 112.

Rotating Body

FIG. 1 also shows that system 100 includes at least one rotating body 131. Rotating body 131 is shown in greater detail and in isolation in FIG. 3. The rotating body 131 has a head portion 133. Head portion 133 is connected to a pivot journal part 135 using an arm or swing arm 132. The journal part is advantageously provided with a shaft aperture 136. The journal part may be adapted to either mount a suitable bearing or a shaft extending through shaft aperture 136 may be mounted for rotation using a suitable bearing or set of bearings (not specifically shown) mounted in the rotating body mounting blocks 124.

Rotating body 131 has an angularly varying non-uniform moment of inertia. This may be more simply termed as being imbalanced relative to the axis of rotation. This imbalance in the rotating body 131 causes the rotating body to accelerate under the force of gravity between the top dead center position shown in FIG. 1 and to decelerate from the dead bottom position of 180 degrees as it moves to the top dead center position. Thus the angular velocity of the rotating body will typically vary and in particular the angular movement of rotating body 131 varies in angular speed and/or otherwise.

The mechanical force applied by the rotating body upon the supporting beam assembly 120 also may vary. At the top dead center position the vertical force carried by the beam assembly is the weight of the rotating body less the centrifugal force applied in an upward direction when the weight is at the top dead center position in rotation. Although the dynamics of the precise force applied is more complex due to any Coriolis acceleration or other dynamics caused by the deflection of the beam assembly in response to this oscillatory force which is relatively smaller when the rotating body is at top dead center as compared to when the rotating body is a bottom dead center.

The resulting effect of this varying force is that the beam assembly oscillates in substantially vertical displacement as a result mostly of elastic deformation. This oscillatory movement is best timed to be at a frequency which is tuned to the natural frequency at which the beam assembly resonates. This can be affected by many different parameters including weight, weight displacement, weight distribution, structural parameters of the beam assembly, the mounting system used to support the beam assembly, the load and other factors which are known or hereafter recognized to provide resonant oscillation with the natural frequency to achieve more elastic storage of energy and greater efficiency.

The deflection of the distal portions of the beam assembly produce deflection at the preferred location of the output 190 which may vary depending on magnitude of the driving forces which in the construction of FIG. 1 are oscillation forces. These oscillation forces and associated displacement are configured to apply output force on the output 190. Depending on the magnitude or resistance of the output the bending moments produced in the beam assembly will vary and may be of either positive or negative sense at the reaction point of the output connection and other positions along the beam assembly.

The specific shape and construction of suitable rotating bodies which can be used in constructions according to the inventions hereof may vary considerably while being operable.

Magnet or Magnets

Figure 3:
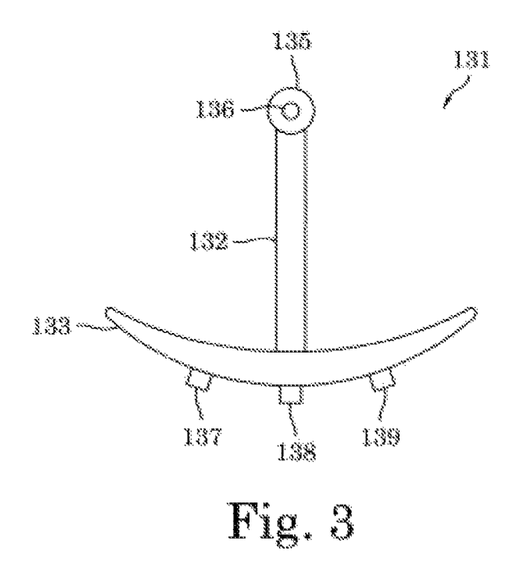
FIG. 3 is a front view of the at least one rotating body shown in isolation.

FIG. 3 shows that the rotating body preferably has at least one magnet or more preferably multiple magnets 137, 138 and 139. In the preferred construction shown the magnets are permanent magnets and do not require any transmission of electrical current thereto. Alternatively, electromagnets may be used and a suitable sliding electrical connection may be possible but is not preferred in the embodiment of FIG. 1 and most others described herein.

As indicated above the rotating body 131 is preferably driven by a driver which keeps the rotating body in orbit despite mechanical losses and the resistance provided by the rotational mounting and the output resistance.

As shown, the driver is in the form of an electromagnetic pulse motor having electromagnets 141, 142 and 143. Electromagnets 141-143 are pulsed with electrical current in a suitable pattern found most advantageous to the particular dynamics of the system for which they are being used and economy of energy.

The pulse motor driver 140 is controlled by controller 185 which advantageously senses the angular position of the rotating body using one or more detectors 186. At the desired times the controller 185 releases electrical charge pulses which generate magnetic fields using windings 145 about electromagnet cores 146 which intermittently pulses the magnet or magnets 137-139 on rotor 131. The pulsing, intermittent action of the electromagnetic pulse motor eliminates the need for continuous energy expenditure and thus can be tuned to the minimum amount needed to maintain rotation. The electromagnetic pulses are timed to optimally occur in conjunction with the magnet or magnets on the rotating body to provide torque thereto.

This may be optimal by having each electromagnet pulse for each magnet on the rotating body to simultaneously fire. Another mode of operation may have the electromagnets of the drive fire sequential. Still another mode is to have the appropriate electromagnets fire sequentially and in each instance of where any rotor magnet is in position to have torque applied thereto. A further alternative is to have an optimization program which applies appropriate magnetic pulses as needed and are not continuous to potentially provide reduced maintenance. What will be optimal may vary from construction to construction and may benefit by using some of these techniques during a part of the cycle, such as at startup, during sustained periods, or upon shut down. Shut down may also provide an opportunity to back-feed electrical charge through the controller to the battery for storage.

FIG. 1 also shows a battery 150 which acts as a store of energy, in the form of electro-chemical energy for controlled use by the pulse motor using controller 185 and electrical control 180 which controls the draw from the battery and charging thereof using a power source, such as electrical power source 160. As shown, the electrical power source may be photo-voltaic or other solar cells, or alternative sources of energy, such as from electrical mains, generators, wind electricity generators, or other suitable energy source which supplies usable power. The stored electrical energy of battery 150 for example can then be used to power the pulse apparatus or other device driving the rotating body.

Second Embodiment

Figure 4:
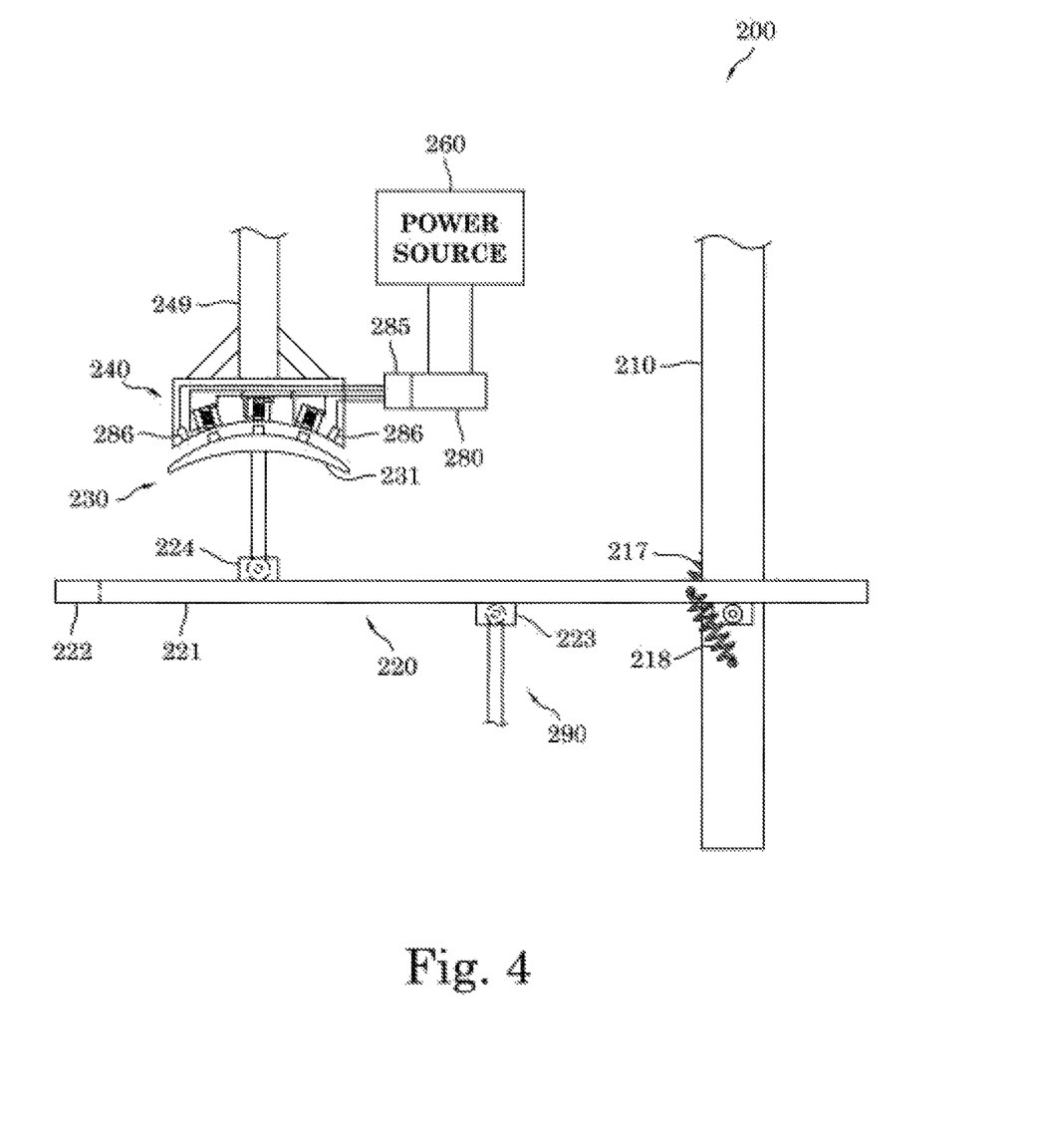
FIG. 4 is a front view of a second embodiment similar to the first embodiment in which the pivot connection to the beam support is shown using a modified construction having springs.
Figure 5:
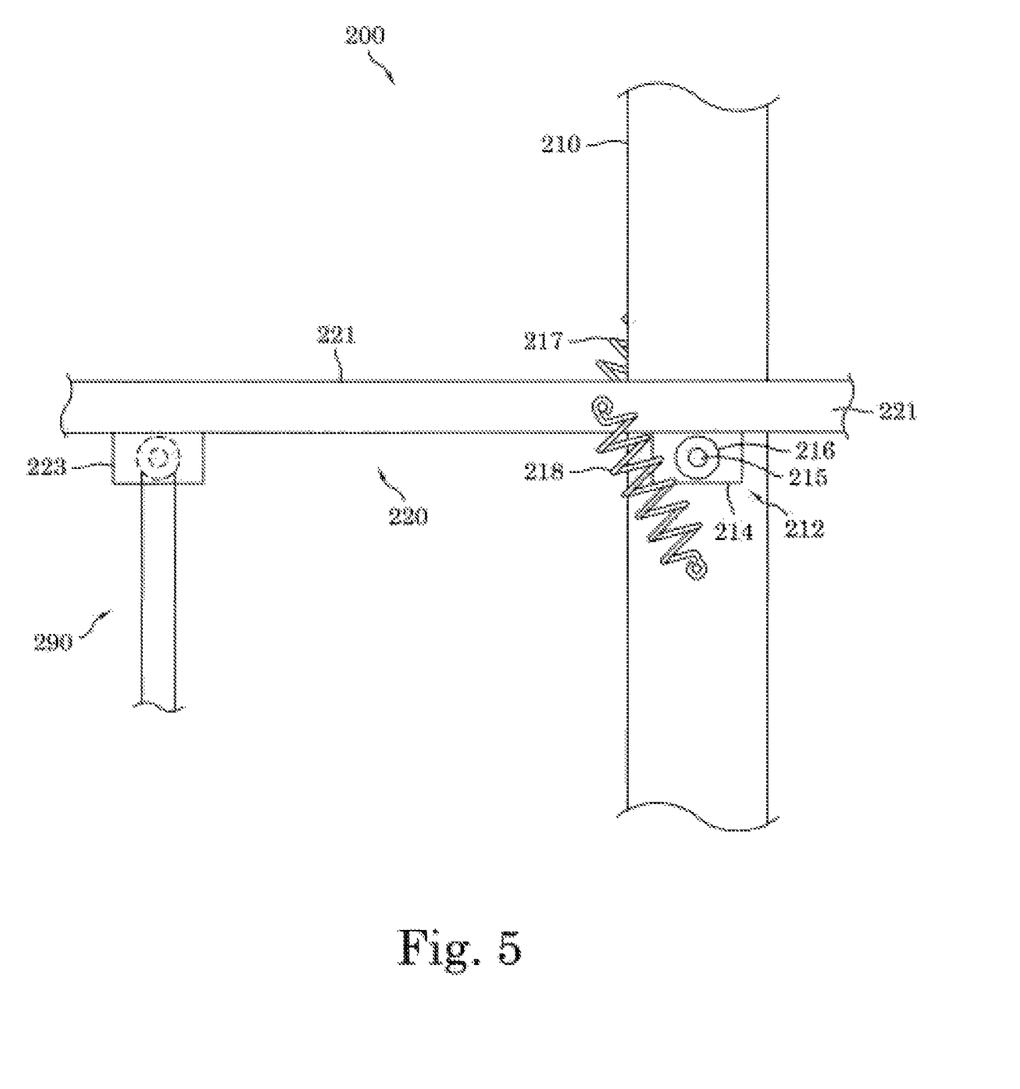
FIG. 5 is an enlarged detailed view of the pivot connection used in the embodiment of FIG. 4.

A second embodiment is depicted in FIG. 4 with FIG. 5 showing in greater detail added features. The second embodiment has features which are numbered as in the first embodiment except the features of the second embodiment are in the 200 numeral range instead of in the 100 numerical range. Otherwise the construction is adequately described by the above except the following differences.

Beam Assembly Springs

FIGS. 4 and 5 show another preferred alternative system 200. The system 200 indicates possible advantage to provide elastic energy storage in the form of one or more springs. As shown the springs are arranged with an upper spring 217 and a lower spring 218. As configured springs 217 and 218 are connected between the beam assembly 220 and the support 210. Alternative connection configurations are possible.

Springs 217 and 218 may serve in either tension or compression whichever best serves operation of the oscillatory movement of the beam assembly 220.

Such springs may alternatively be formed using other known spring configurations, such as air or other gas springs, wound springs, and many other possible types now known or hereafter developed and found suitable to facilitate operation or efficiency of system 200.

System 200 also differs in that the power source 260 may be of various types of electrical power storage, such as provided by battery 250, or using other electrical energy storage subsystems, for instance capacitive or other suitable devices.

An additional aspect of system 200 as shown is that it advantageously includes two position sensors 286 for providing added information for the control subsystem or subsystems being used.

Third Embodiment

Figure 6:
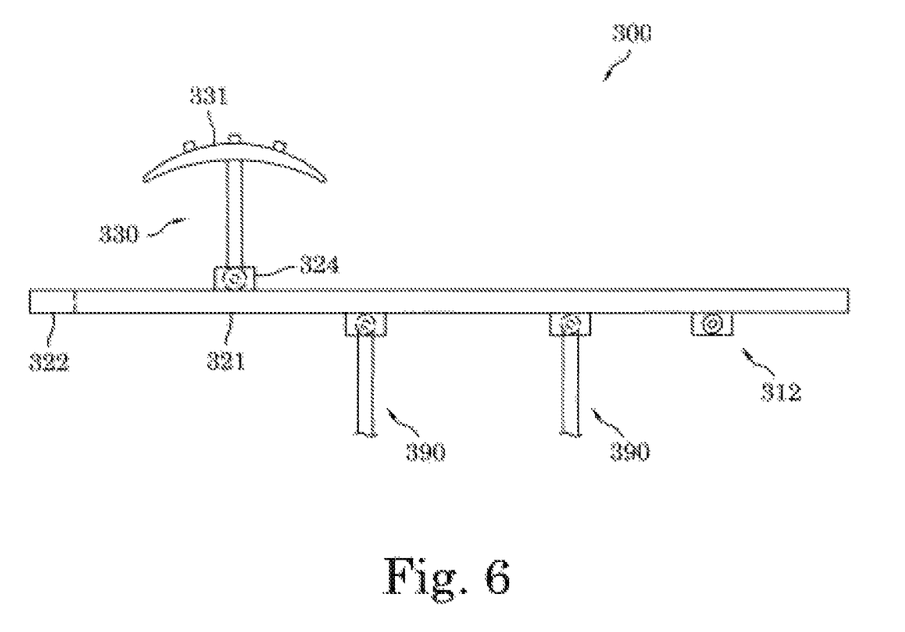
FIG. 6 is a side view showing relevant parts of an alternative third embodiment.

A third embodiment is depicted in FIG. 6. The third embodiment has features which are numbered as in the first embodiment except the features of the third embodiment are in the 300 numerical range instead of in the 100 numerical range. Otherwise the construction is adequately described by the above except the following differences.

Dual Outputs

The system 300 is like system 100 except it has two outputs 390 which will have expected different displacements. Thus the outputs can be used to drive appropriate pieces or equipment or pieces of equipment best utilizing this configuration. One example may be a pump or compressor having two stages built to use either in parallel or more likely in sequence to achieve two-stage pressure increases. This may be utilized in a heat pump, air compressor, liquid pump, compressed gas motor or other applications using such outputs.

Fourth Embodiment

Figure 7:
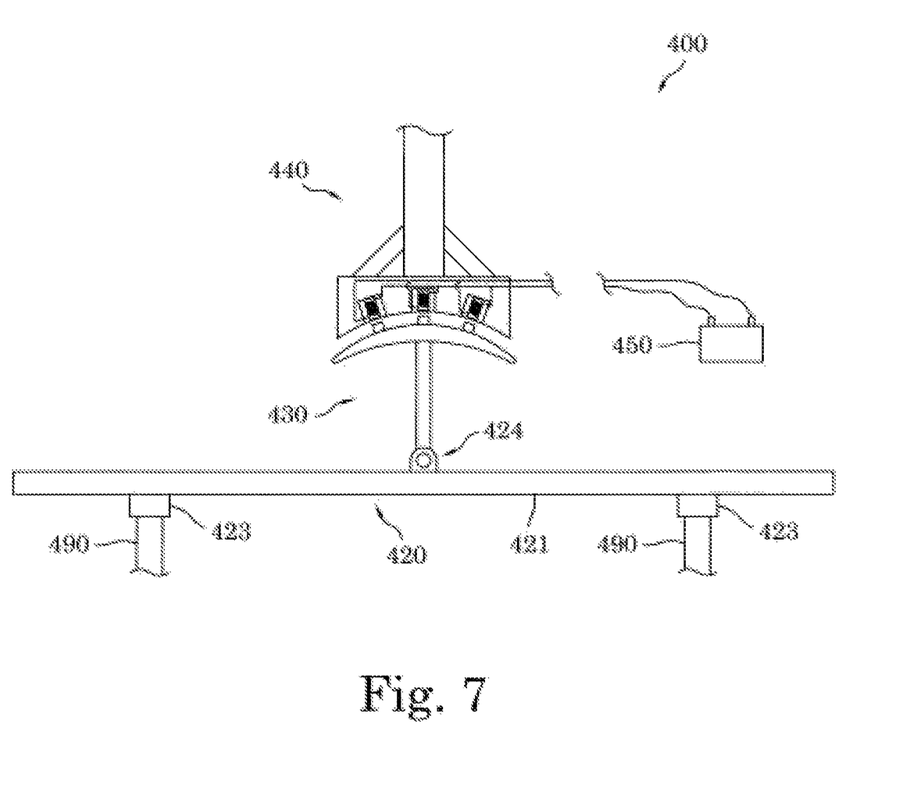
FIG. 7 is a partial side view of a forth alternative embodiment.

A fourth embodiment system is diagrammatically depicted in FIG. 7. The fourth embodiment has features which are numbered as in the first embodiment except the features of the fourth embodiment are in the 400 numerical range instead of in the 100 numerical range. Otherwise the construction is adequately described by the above except the following differences.

Combined Support and Outputs

FIG. 7 shows that system 400 uses two outputs 490 as the outputs and supports from the deflecting beam assembly 420. This configuration may be possible in some instances and be suitable or more suitable than other configurations taught herein.

FIG. 7 shows a simply supported beam configuration wherein the oscillatory forces are distributed between the output/supports. As shown, this is advantageously done with the oscillatory force centered therebetween.

Fifth Embodiment

Figure 8:
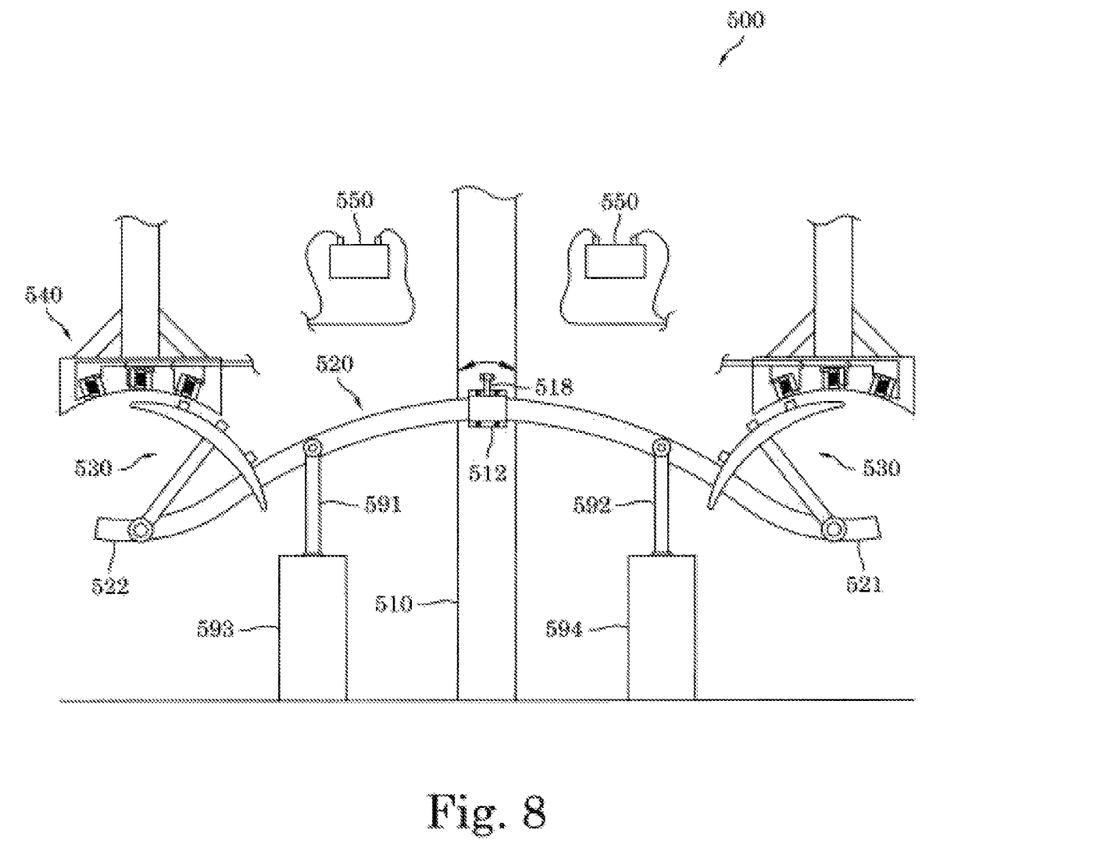
FIG. 8 is a partial side view of a fifth alternative embodiment system according to the inventions hereof showing beam assemblies extending in both directions from the beam support and having two rotating bodies.

A fifth embodiment system according to certain aspects of the inventions hereof is depicted in FIG. 8. The fifth embodiment has features which are numbered as in the first embodiment except the features of the fifth embodiment are in the 500 numerical range instead of in the 100 numerical range. Otherwise the construction is adequately described by the above except the following differences.

Support and Beam Connection

FIG. 8 shows a dual cantilevered beam construction 520. The beam assemblies may be considered in parts 521 and 522. As shown the beams are advantageously arched or otherwise shaped in a curvilinear manner to reduce overall system height and to take advantage of any synergistic effects associated with having the beam assembly supported at the desired central position. Such construction advantageously has two rotating bodies 530.

Deflecting Members

FIG. 8 shows an embodiment in which the deflecting members have a generally bow-shaped construction which may be easier to tune to a desired natural resonance frequency. The deflecting members may have other possible shapes and constructions as well. Each separate construction may be adapted to make the apparatus more efficient depending on the specific construction of the accompanying parts.

Connection of Deflecting Members

In FIG. 8 the deflecting members 521 and 522 are advantageously mounted upon the sides of the support 520. The positioning of the right and left portions 521 and 522 of the deflecting members may be adjusted by an adjustment such as in the form of a tuning piece. A tuning piece is advantageously in the form such as a movable bolt or other part which engages the central part of the beam assemblies using a mount 512. The bolt can be engaged in varying degrees and at an adjustable position to balance the resonant frequencies of the two different sides and to otherwise affect oscillatory action or dynamic response of the beam assemblies. This may facilitate adjustment of the natural frequencies and thus allow the two beam subassemblies to achieve matching resonance. Such coordinated natural resonance may provide elastic dynamic response characteristics for the deflecting members which is advantageous in some manner either operationally or from an efficiency standpoint.

As shown in FIG. 8, the connection includes a connection or mounting piece 512 which is screwed or otherwise mounted to the support. The dampening of the connection can be varied by the coordination or dis-coordination of the mounting cap and the shape of the adjacent beam assembly part received therein. Such may also be affected by using springs as indicated above or by using an enclosed elastic ferrule to achieve the desired resonant frequencies and cooperating degree of dampening, if any dampening is found desirable for some benefit.

The deflecting members can also be connected in any other alternative way such as described above and other suitable alternatives now known or discovered of developed hereafter.

Rotating Bodies

As depicted in FIG. 8, there may be more than one matching eccentrically loaded rotating body or rotor 530. In the case that there are more than one, the eccentrically loaded rotating bodies may be advantageously built substantially similar in structure. Each additional rotating body is mounted on deflecting members 520. These may or may not be equidistant from the connection with the support depending on the loads applied by outputs 591 and 592.

Each rotating body 531 and 532 may have its own separate pulse motor which may or may not run from the same input and operate as the same frequency and develop the same forces. Operation out of phase may be found superior in some cases, or other operational regimes may be found most preferred for different applications and installations having different loads. As shown, the outputs 591 and 592 drive compressors 593 and 594.

Sixth Embodiment

Figure 9:
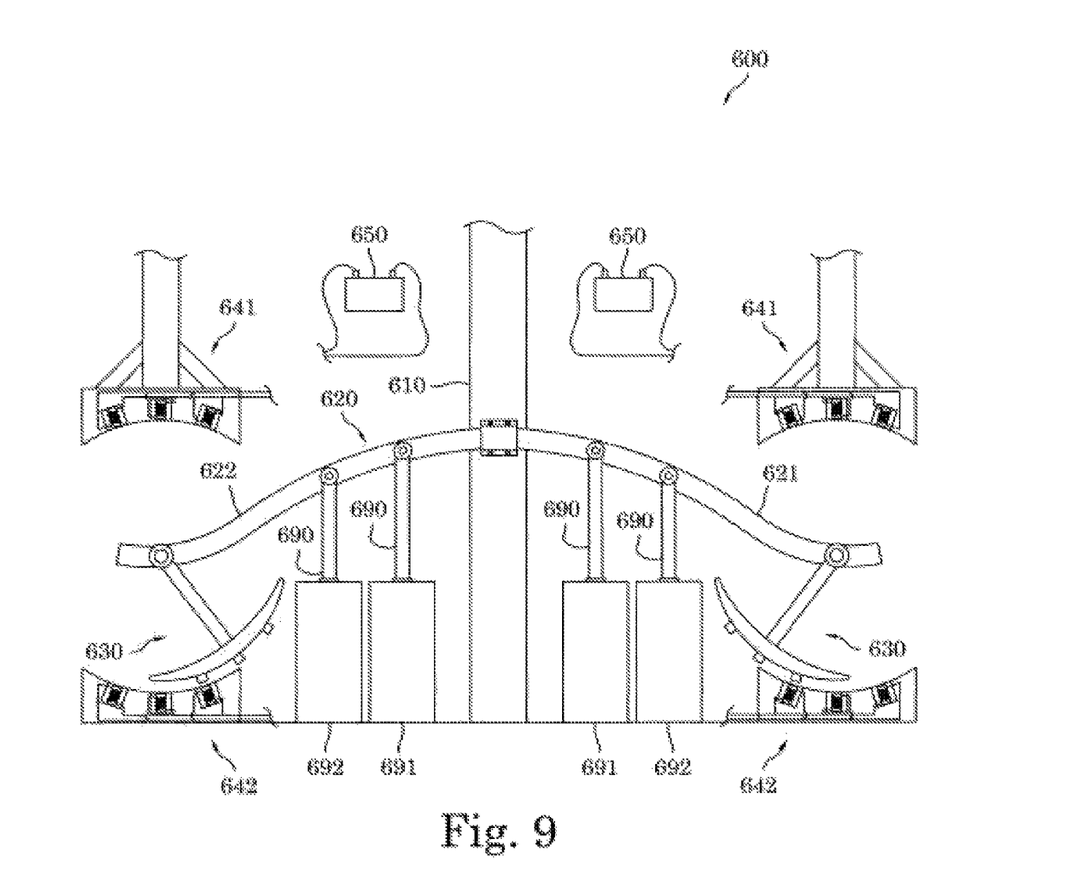
FIG. 9 is a partial side view of a sixth alternative embodiment similar in many respects to the fifth embodiment and having plural outputs.

A sixth embodiment system 600 is depicted in FIG. 9. The sixth embodiment has features which are numbered as in the first embodiment except the features of the sixth embodiment are in the 600 numerical range instead of in the 100 numerical range. Otherwise the construction is adequately described by the above embodiments except the following differences.

Drive Assemblies

System 600 advantageously uses a cantilevered construction similar to that depicted in FIG. 8. However system 600 has dual drivers associated with each rotating body. The upper drivers 641 and lower drivers 642 have control systems and position sensors (not shown) analogous to those shown for system 100 but adjusted or added to in order to provide pulsed driving of the rotating body 630 at more than one position about the angular displacement range of the rotating body.

The system configuration may be preferred in certain installations. One possible advantage may be that the system 600 can be started after the imbalanced rotors are de-energized and left to swing into a downward position. Automatic restart would be facilitated by the lower drives 642 which may apply torque in as many passages as needed to achieve full rotation. This may involve pendulum action until the rotors have achieved positions where the upper drivers can apply torque and using controllers and position sensors to determine the direction of rotation implemented by the control system.

During operation the rotors may operate in phase, out of phase or in another relationship which facilitates the use of the outputs to drive pumps, compressors or other inner equipment 691 and outer equipment 692 connected to the oscillating beam assemblies 620 which have first sides 621 and second sides 622.

It is also possible that only upper drivers 641 may be needed once operation has reached the desired angular velocity to potentially reduce the amount of energy consumed in maintaining operation.

Dual Outputs Along Each Side

Another possible advantage of system 600 is that torque may be applied to the rotors 630 at both the top and bottom or other suitable positions to help drive the added load of dual outputs 690 which are connected to the beam assemblies extending in each direction from the support 610. The upper and lower drives may also be used to adjust the angular velocity in a more controlled manner than provided merely by gravitational force converted into angular momentum under the first embodiment and others which may be constructed by the systems and apparatuses according to the inventions hereof.

Seventh Embodiment

Figure 10:
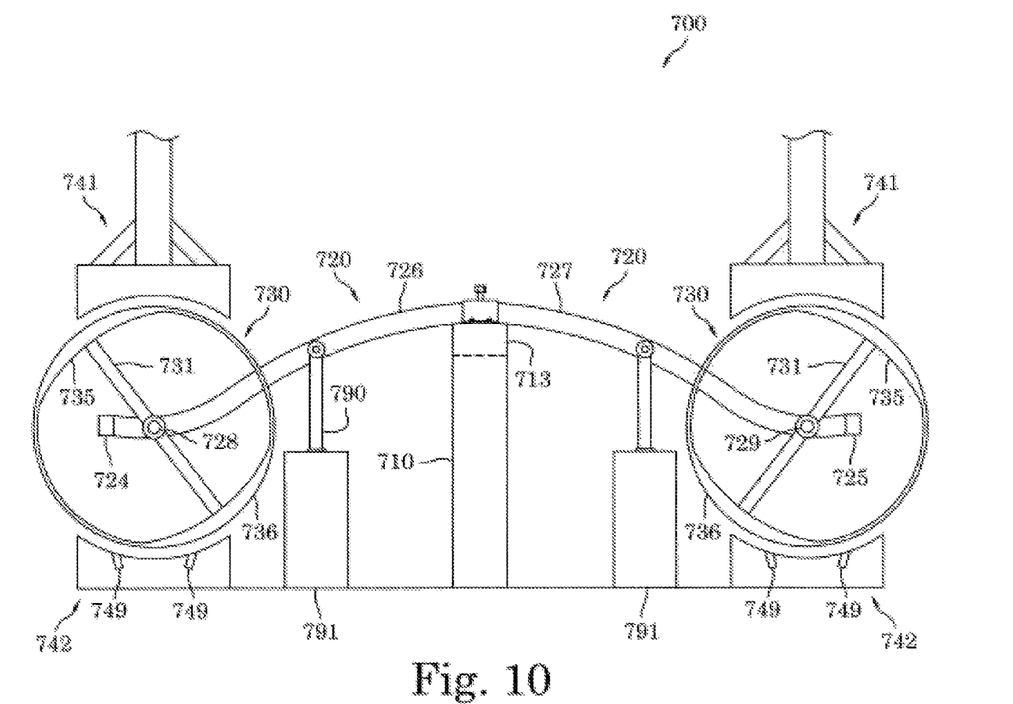
FIG. 10 is an alternative seventh embodiment.
Figure 11:
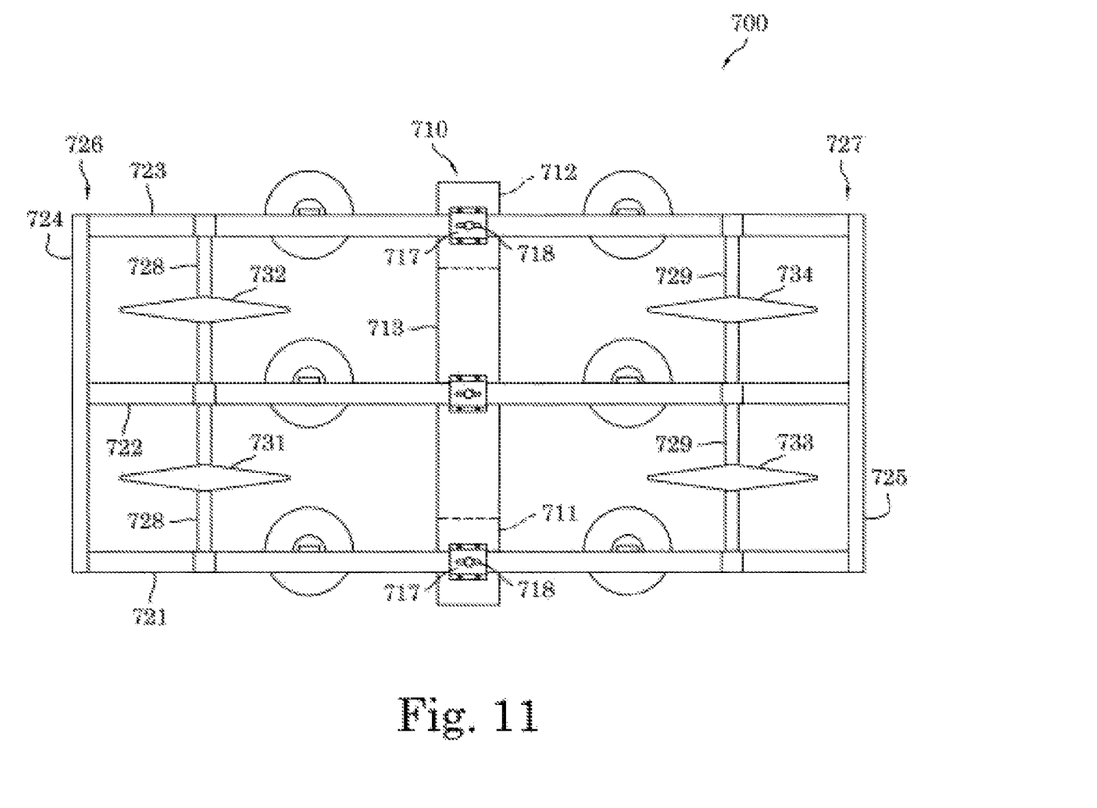
FIG. 11 is a top diagrammatic view showing portions of the system of FIG. 10.

A seventh embodiment system 700 is depicted in FIGS. 10 and 11. The seventh embodiment has features which are numbered as in the first embodiment except the features of the seventh embodiment are in the 700 numerical range instead of in the 100 numerical range. Otherwise the construction is adequately described by the above descriptions except the following differences.

Support, Beams and Beam Couplings

Support 710 is constructed differently and has two uprights 711 and 712 which support a horizontal support member 713 to which the beam assemblies are mounted upon an upper surface thereof.

The horizontal support member 713 has three beam mounting couplings 718 which are used to connect three parallel beams 721, 722 and 723 into beam assemblies 720 extending in each direction to form two beam assemblies 726 and 727 which are at the first or left side and the second or right side as pictured in FIGS. 10 and 11. The two beam assembly parts 726 and 727 extend from the centrally located support member 710.

In the configuration shown in FIGS. 10 and 11 the distal ends of the beams are connected by transverse beam end pieces 724 and 725. Thus the beam assemblies 726 and 727 preferably operate in unison. However, the opposing beam assemblies may be in phase, out of phase or in a more complex deflection relationship if found desirable.

Rotating Bodies

FIGS. 10 and 11 show dual rotors 731 and 732 at the first side mounted upon the first beam assembly 726 and dual rotors 733 and 734 at the second side mounted upon the second beam assembly 727. As shown the rotors are formed as wheels.

Each rotor may have one or more diametric members 731 which allow them to be supported upon first and second shafts 728 and 729 at the first and second beam ends 726 and 727. Due to the connected nature of the beam assembly ends using the end pieces 724 and 725, the rotors turn in unison at each end.

The rotors can be provided with opposing mounting sections 735 and 736 which are preferably used to provide added strength where the diametrical spoke or arms 731 connect thereto. The weight of the mounting sections is preferably different so that the imbalance causes the oscillatory forces to be developed to deflect the beam assemblies at their natural frequencies.

Due to the inclusion of the opposed mounting sections 735 and 736 the weights of each may be adjustable to achieve varying frequencies which in some cases may make it easier to tune the system to provide uniform deflection even though the rotors and beams are ganged together. Depending on the angular velocity and weight imbalance it may be possible to achieve lower or higher frequencies by adjusting the imbalance.

Power Source

In this embodiment the upper and lower drivers associated with each rotor may be electromagnetic as shown above or use another form of applying torque without contact. For example air jets 749 could be used if the outputs 790 are connected to compressors 791 and a tank (not illustrated) to store energy in the form of compressed air which maintains energy capacity without losses better than batteries in many instances, particularly over long periods of inactivity.

Alternatively, the drivers may be a combination of electromagnetic and air pulsations if quicker startup is desired and storage of energy is desired in more than one type of energy storage form. This arrangement may allow air jetting at startup coupled with operation of upper and lower electromagnetic drives during further speed increase and then return to simply electromagnetic drive by the top drivers as in other embodiments described above.

Interpretation Notes

The above description has set out various features, functions, methods and other aspects of the inventions. This has been done with regard to the currently preferred embodiments thereof. Time and further development may change the manner in which the various aspects are implemented. Such aspects may further be added to by the language of the claims which are incorporated by reference hereinto as originally filed.

The scope of protection accorded the inventions as defined by the claims is not intended to be necessarily limited to the specific sizes, shapes, features or other aspects of the currently preferred embodiments shown and described. The claimed inventions may be implemented or embodied in other forms while still being within the concepts shown, described and claimed herein. Also included are equivalents of the inventions which can be made without departing from the scope of concepts properly protected hereby.

I claim:

1. An apparatus for providing power comprising:
   a rotor coupled to a pump mechanism, the pump mechanism operated when the rotor spins;
   a rotor magnet mounted on the rotor; and
   an electromagnetic pulse motor powered by a power source and is controlled to act upon the rotor magnet mounted on the rotor to apply an intermittent torque thereto.

2. An apparatus according to claim 1, further comprising a spring mechanism configured to alternately store and release energy provided by motion of the rotor.

3. An apparatus according to claim 1, wherein the rotor is coupled to the pump mechanism through a beam configured to deflect in an oscillating manner as the rotor rotates, the beam at least partially deflected by a centripetal or centrifugal force generated during a rotation of the rotor.

4. An apparatus according to claim 1, further comprising a spring mechanism configured to alternately store and release energy provided by motion of the rotor wherein the spring mechanism provides a variable force on the beam, the magnitude and direction of the force based on the spring mechanism being in a state of compression or tension as the beam deflects.

5. An apparatus according to claim 4, wherein the spring mechanism comprises a first spring to control the deflection of the beam in a first direction and a second spring to control the deflection of the beam in a second direction.

6. An apparatus according to claim 3, wherein one end of the beam is maintained in a substantially fixed position relative to the motion of the rotor and the pump mechanism is coupled to the beam at a location between the fixed end and the location at which the rotor is mounted upon the beam.

7. An apparatus according to claim 3, wherein one end of the beam is maintained in a substantially fixed position relative to the motion of the rotor and wherein the pump mechanism comprises a plurality of mechanical pumps coupled to the beam at locations between the fixed end and the location at which the at least one rotor is mounted upon the beam, wherein the location of each mechanical pump is preselected based on the amount of deflection to be provided to each mechanical pump.

8. An apparatus according to claim 3, wherein the apparatus comprises at least two rotors with a fulcrum provided at a location on the beam between the at least two rotors.

* * * * *